United States Patent [19]

Unehara et al.

[11] Patent Number: 4,905,135
[45] Date of Patent: Feb. 27, 1990

[54] INVERTER APPARATUS

[75] Inventors: Shunsuke Unehara, Kadoma; Sachio Ueno, Katano; Tutomu Seri, Hirakata, all of Japan

[73] Assignee: Matsushita Electric Industrial Co., Ltd., Kadoma, Japan

[21] Appl. No.: 199,035

[22] PCT Filed: Sep. 7, 1987

[86] PCT No.: PCT/JP87/00663
§ 371 Date: Jul. 12, 1988
§ 102(e) Date: Jul. 12, 1988

[87] PCT Pub. No.: WO88/02195
PCT Pub. Date: Mar. 24, 1988

[30] Foreign Application Priority Data

Sep. 12, 1986 [JP] Japan ................. 61-216620

[51] Int. Cl.$^4$ .................. H02M 5/42; H02P 5/40
[52] U.S. Cl. ........................... 363/98; 363/41; 363/17; 318/811
[58] Field of Search ............ 363/37, 41, 98, 132, 363/136, 17; 318/807–812, 805, 798

[56] References Cited

U.S. PATENT DOCUMENTS

| | | | |
|---|---|---|---|
| 4,011,489 | 3/1977 | Franz et al. | 318/798 |
| 4,698,577 | 10/1987 | Seymour et al. | 318/805 |
| 4,767,976 | 8/1988 | Mutoh et al. | 318/808 |
| 4,785,225 | 11/1988 | Horie et al. | 318/811 |
| 4,800,327 | 1/1989 | Fujioka et al. | 318/811 X |

FOREIGN PATENT DOCUMENTS 58-179196 10/1983 Japan .
61-94585 5/1986 Japan .
61-98191 5/1986 Japan .

OTHER PUBLICATIONS

M. Utaka et al,; "Noise-less Inverter Using BI-MOS Semiconductor Device"; pp. 25 (831)–pp. 29 (835); Mitsubishi Denki Giho, vol. 58, No. 12, published Dec. 25, 1984.

Primary Examiner—Patrick R. Salce
Assistant Examiner—Emanuel Todd Voeltz
Attorney, Agent, or Firm—Cushman, Darby & Cushman

[57] ABSTRACT

The present invention relates to an inverter apparatus which controls a rotation speed of an electric motor by varying a frequency of voltage being applied to an induction electric motor. A pulse width modulating signal is generated by comparing a modulated wave signal with a triangular wave signal. The modulated wave signal is obtained by amplifying an error between a magnetic flux command signal having a frequency proportional to a frequency command from an outside source and an integral of a voltage signal being applied to a motor, the voltage signal being an output voltage of an inverter part. The triangular wave signal is a carrier frequency signal of a non-audible frequency, but even if the carrier frequency is made to be an audible frequency, distortion of the output voltage can be minimized. Therefore, the inverter apparatus can drive the motor with low noise.

14 Claims, 7 Drawing Sheets

FIG. 2a
(PRIOR ART)
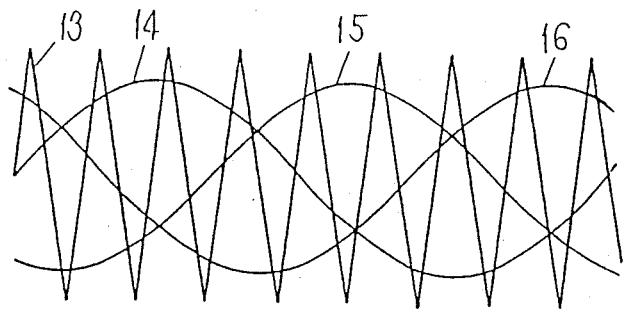
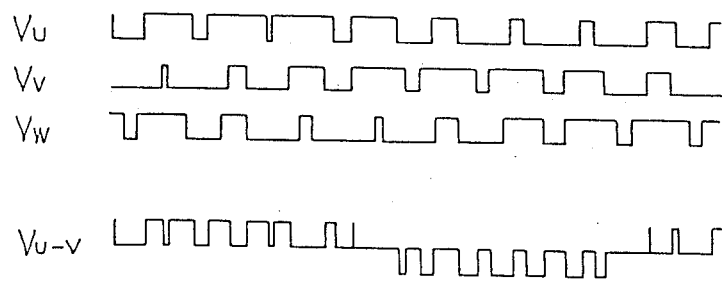
FIG. 2b
(PRIOR ART)
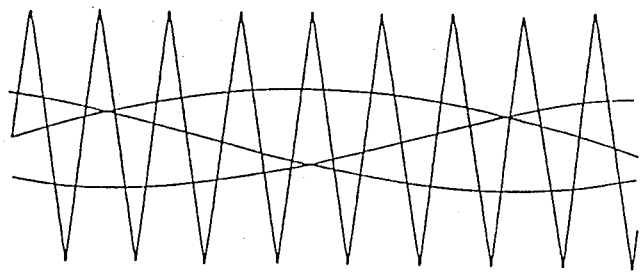
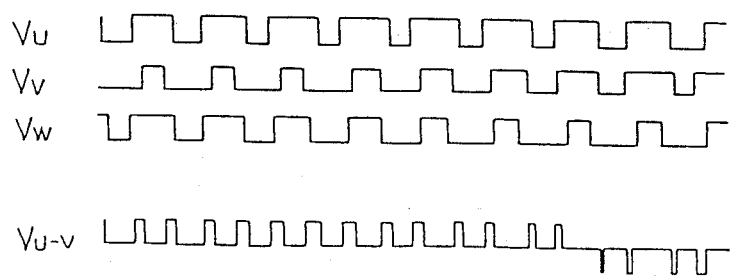

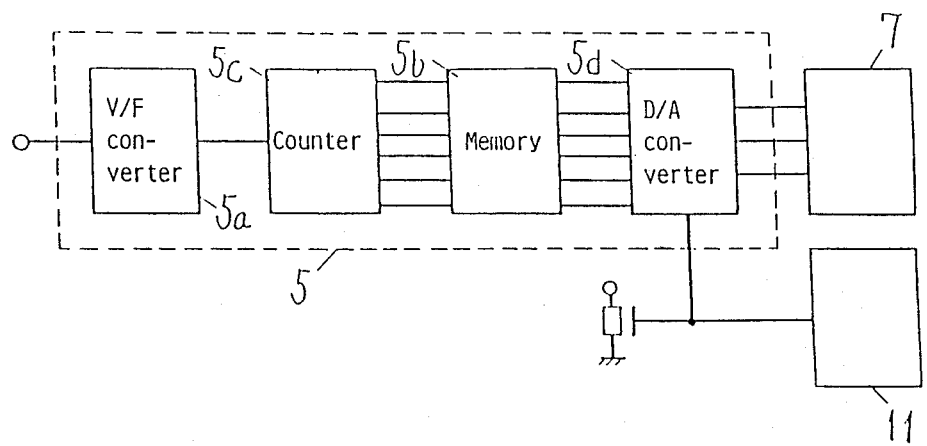
Fig.5
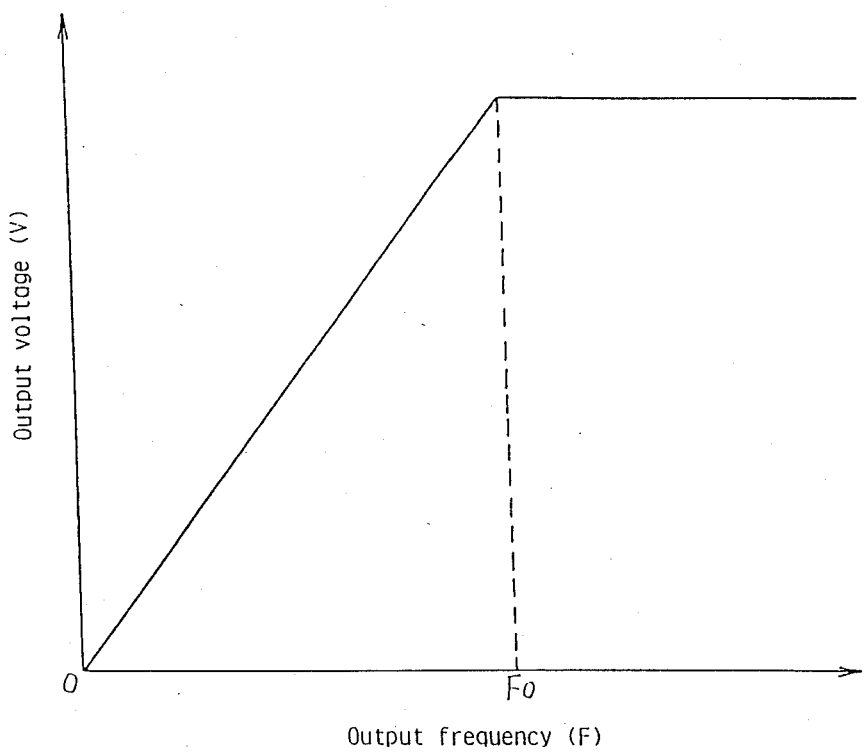

INVERTER APPARATUS

TECHNICAL FIELD

The present invention relates to an inverter apparatus which controls rotation speed of an electric motor by varying a frequency of a voltage supplied to an induction electric motor.

BACKGROUND ART

Generally, when an induction electric motor is driven by a convention inverter apparatus, a variable voltage--variable frequency control (hereinafter is referred to as VVVF control) is used. The VVVF control controls a magnetic flux of the motor so as to be always constant even when the output frequency of the inverter apparatus is varied. The VVVF control also controls fundamentally a ratio of a voltage applied to the motor and a frequency applied to the motor such that the ratio remains constant. Thus, the ratio V/F of an output voltage V and an output frequency F of the inverter apparatus is made constant.

An example of the conventional inverter apparatus is shown in FIG. 1. Numeral 1 designates a three phase or single phase power source, in this case a three phase power source. Numeral 2 designates a converter part (regular conversion part) of the inverter apparatus, and numeral 3 designates an inverter part (reverse conversion part). Numeral 4 designates the induction electric motor, which is three-phase coupled with inverter part 3. Numeral 12 is a PWM signal generating circuit which generates a pulse width modulating signal (hereinafter is referred to as PWM signal) of width proportional to an output frequency signal from an outside source. The PWM signal generated by PWM signal generating circuit 12 is transmitted to driver circuit 10 through a photo-coupler or a relay, and is input either as a base input signal or a gate input signal of a switching element such as power transistor, thyristor of inverter part 3 through driver circuit 10.

PWM signal generating circuit 12 has a memory and a microcomputer. An example of the relation of the PWM signal and the three-phase terminal voltage is shown in FIG. 2a and 2b. FIG. 2a shows a signal of inverter part 3 in a high output frequency, and FIG. 2b shows a signal of inverter part 3 in a low output frequency. The horizontal direction in FIG. 2a and FIG. 2b shows time and a vertical direction shows output values. In FIG. 2a, numeral 13 designates a triangular wave signal, and numerals 14, 15, 16 designate sinusoidal wave signals. The sinusoidal wave signals 14, 15, 16 have a phase difference of 120° with respect to each other. A U-phase terminal voltage Vu is obtained by voltage comparison of sinusoidal wave signal 14 and triangular wave 13. A V-phase terminal voltage Vv is obtained by voltage comparison of sinusoidal wave signal 15, having a phase difference of 120°, to the sinusoidal wave signal 14. Finally, a W-phase terminal voltage Vw is obtained by voltage comparison of a sinusoidal wave signal 16, having phase difference of 120°, to the sinusoidal wave signal 15. When VVVF control is made, a ratio of wave height values of the sinusoidal wave signals 14, 15, 16 and a wave height value of the triangular wave signal 13 is changed by means of frequency. As a result, in high frequency (a state of FIG. 2a) the voltage applied to motor 4 is increased, and in low frequency (a state of FIG. 2b ) the voltage is reduced, such that the controlled ratio of the motor applying voltage and the frequency is usually constant.

By the above-mentioned principle, the PWM signal is generated by PWM signal generating circuit 12, and a switching timing of inverter part 3 is determined. In order to prevent a short circuit phenomenon by simultaneous trigger of the upper and lower elements which are coupled in series to the plural switching elements of inverter part 3, a short circuit preventing period td is set. The short circuit preventing period td is described in FIG. 6 of page 28 (834) of "MITSUBISHI DENKI GIHO" Vol. 58.No. 12.1984, and therefore the details are omitted.

A problem with the short circuit preventing period td is that it generates an error voltage corresponding to an output current from driver circuit 10 and distorts the output voltage waveform of inverter part 3. As the output voltage is lowered, the distortion increases; further, as the switching frequency (hereinafter is referred to as a carrier frequency) of the upper and lower elements increases, wherein the upper and lower elements are connected in series with the switching elements of the inverter part 3, the distortion increases. Thus, there is a problem of generating a pulsation of torque in induction electric motor 4. Though it is possible to lower the carrier frequency to overcome the pulsating torque, in the case that the carrier frequency is lowered, there is a possibility that the pulsation or vibration of the induction electric motor enters the audio frequency range, thus generating noise.

In order to solve the above-mentioned problem an inverter apparatus having a constitution as shown in FIG. 5 of page 27 (833) of "MITSUBISHI DENKI GIHO" Vol. 58.No. 12.1984 is considered. The constitution is that a voltage applied to the electric motor is detected through an instant voltage detecting circuit; a signal which is output from a sinusoidal wave reference voltage circuit on the basis of a V/F command signal is compared with a signal which is output from the instant voltage detecting circuit. The two signals are then input to the PWM circuit to drive the inverter part on the basis of the inputted compared signal. Since only the distortion of the output waveform can be corrected by feedback of the applied voltage, the carrier frequency can be raised up to 20 KHz, so that a noiseless state is realized. However, since the VVVF control of constant ratio V/F is being used, in the case where a power source voltage supplied to the inverter part is varied, a different output voltage is generated to the same output frequency, thus causing instability.

SUMMARY OF THE INVENTION

A main object of the present invention is to provide a stable inverter apparatus for driving a low noise electric motor wherein the carrier frequency is a non-audible frequency, the inverter apparatus reducing a distortion of a waveform of an output voltage and obtaining a voltage corresponding to the carrier frequency even when a power source voltage is varied.

The above-mentioned object of the present invention is attained by providing an inverter apparatus which generates a PWM signal by comparison of a magnetic flux command signal of a frequency, a modulation wave signal and a triangular wave signal. The magnetic flux command signal is proportional to a frequency command from an outside output and is generated by a magnetic flux command signal generating circuit; the modulation wave signal is a result of amplifying an error between the magnetic flux command signal and a voltage integrating signal, the voltage integrating signal being an integral of the inverter output voltage, the inverter providing power to the motor; and the triangular wave signal is a carrier frequency of the non-audible frequency.

The inverter apparatus of the present invention comprises: a magnetic flux command signal generating circuit for generating a magnetic flux command signal of a frequency which is proportional to an external inverter output frequency signal; an integrating circuit for integrating an output voltage of the inverter supplying electric power to an electric motor to thereby output a motor voltage integrating signal; an error amplifying circuit for outputting a first signal by amplifying an error signal between the motor voltage integrating signal and the magnetic flux command signal; a triangular wave generating circuit for generating a carrier frequency signal; and a comparing circuit for generating a pulse width modulation signal on the basis of a comparison of the first signal and the carrier frequency signal, the carrier frequency signal consisting essentially of a triangular wave.

The inverter apparatus of the present invention further provides that the magnetic flux command signal includes a sinusoidal wave and a second waveform having harmonic components of order of an odd number and which are multiple of three times the fundamental frequency of the sinusoidal wave.

The inverter apparatus of the present invention further comprises an automatic magnetic flux reducing circuit for reducing a wave height value of the magnetic flux command signal to be inversely proportional to a frequency of the output voltage when the frequency of the output voltage exceeds a predetermined frequency, thereby entering a voltage constant region from variable voltage, variable frequency control region.

BRIEF DESCRIPTION OF THE DRAWINGS

FIG. 2a and 2b are figures showing relations of a PWM signal generation and three-phase terminal voltages in the conventional inverter apparatus;

FIG. 4 is a figure showing a magnetic flux command circuit to be used in an embodiment of the present invention;

FIG. 5 is a graph of an output voltage versus an output frequency according to a characteristic of the inverter apparatus in the embodiment of the present invention;

BEST MODE FOR CARRYING OUT THE INVENTION

Hereinafter, an embodiment of the present invention is described referring to the figures.

Figure 1:
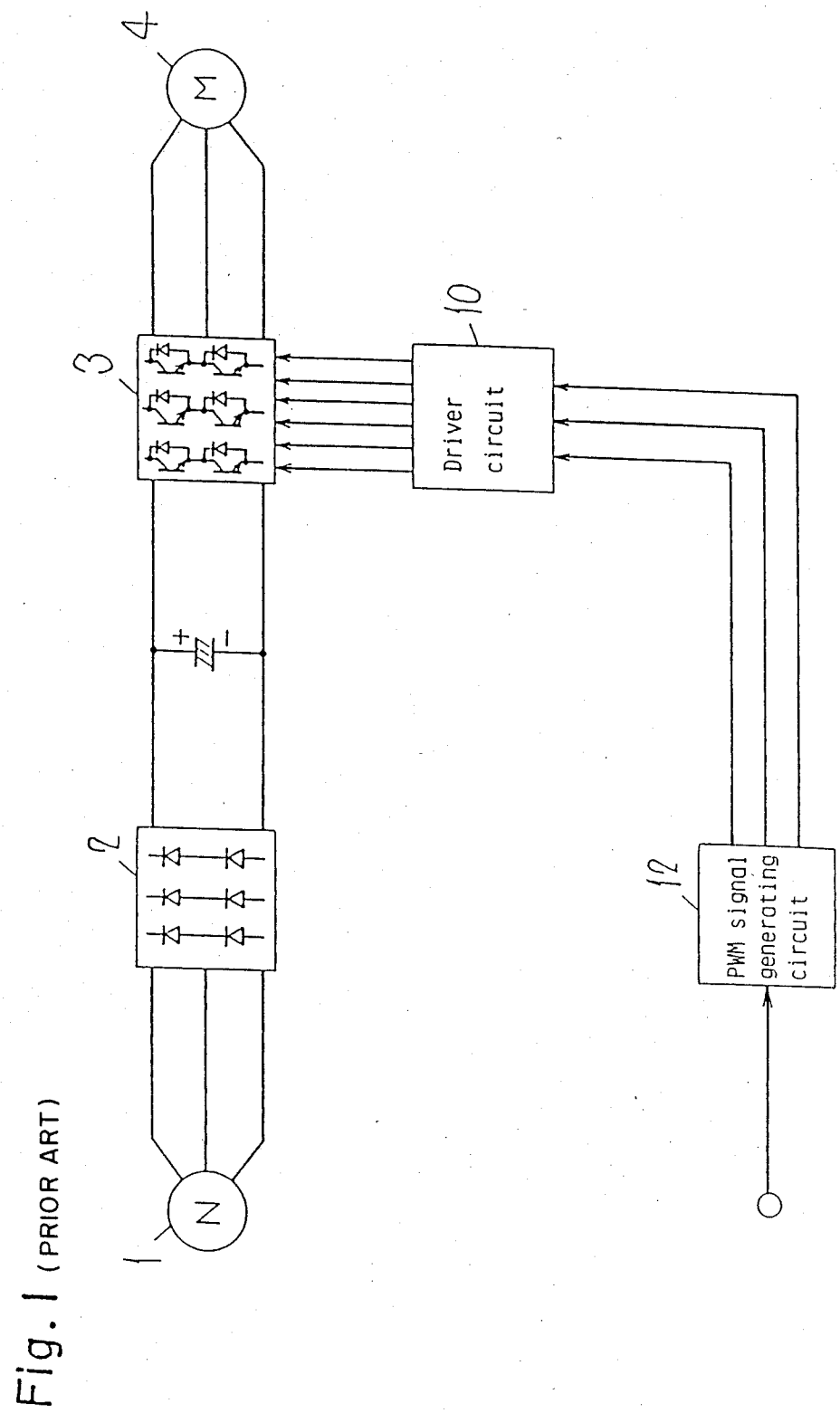
FIG. 1 is an electrical configuration figure of a conventional inverter apparatus.
Figure 3:
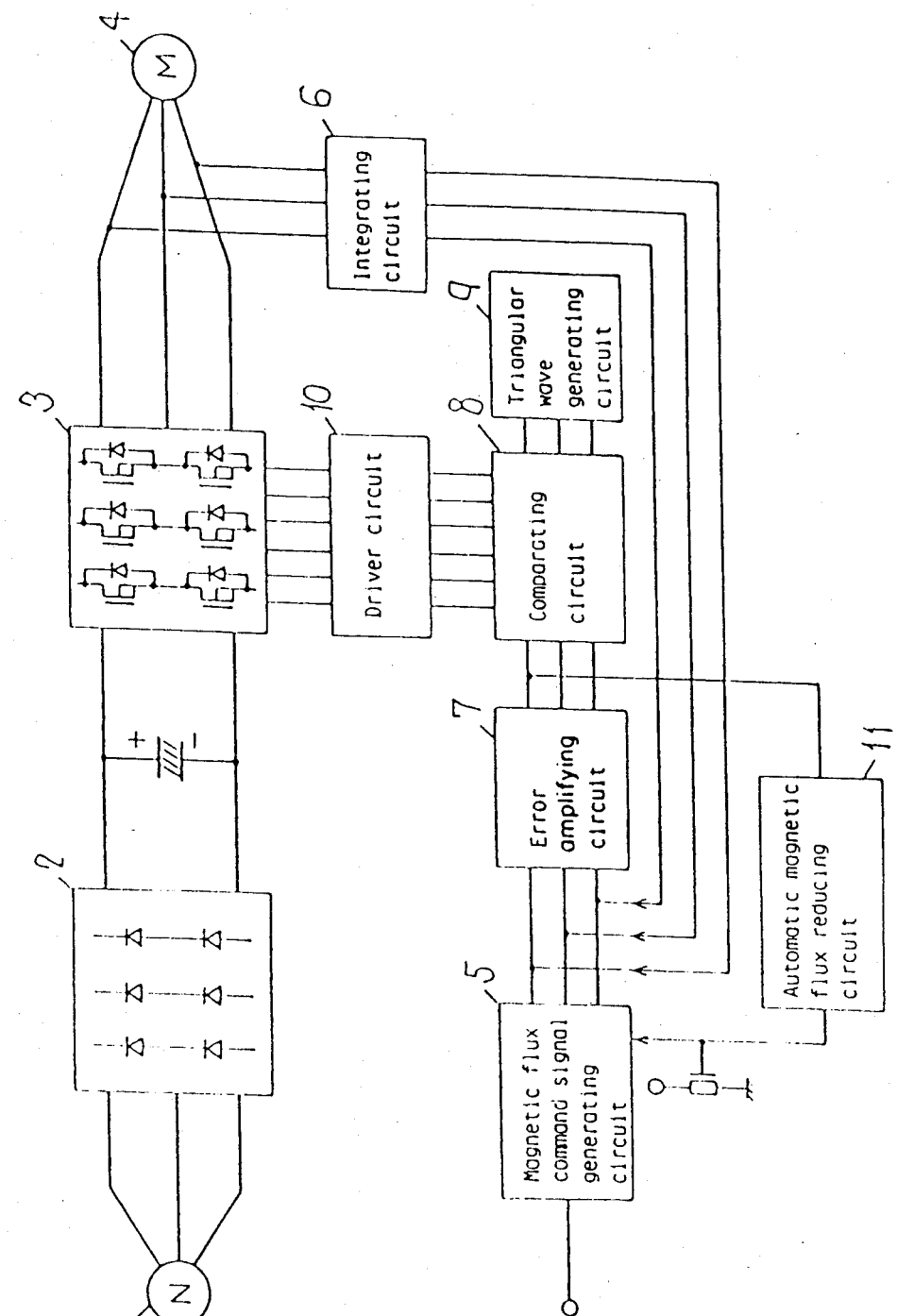
FIG. 3 is an electrical figure of an inverter apparatus in an embodiment of the present invention.

In FIG. 3, numeral 1 designates a power source, numeral 2 a converter part, numeral 3 an inverter part, numeral 4 an induction electric motor, and numeral 5 a magnetic flux command signal generating circuit. Magnetic flux command signal generating circuit 5 generates a magnetic flux command signal of a frequency which is proportional to an inverter output frequency signal from an outside source. Voltages of three phases which are applied to electric motor 4 from inverter part 3 are integrated by integrating circuits 6, respectively, and motor voltage integrated signals which are obtained by integrating circuit 6 are fed back onto the magnetic flux command signal of three-phases, respectively.

These motor voltage integrated signals fed back onto the magnetic flux command signal of three phases are amplified by error amplifying circuit 7, which is formed by an operational amplifier, to generate a modulated wave. Numeral 8 designates a comparing circuit. A PWM signal is generated by comparing a carrier frequency signal of non-audible frequency region (over 20 KHz) with the above-mentioned modulated wave. The carrier frequency signal is generated by triangular wave generating circuit 9. The PWM signal becomes a base signal or a gate signal of a switching element of inverter part 3 through a driver circuit 10. The above-mentioned short circuit preventing period td is set in the driver circuit 10. Numeral 11 designates an automatic magnetic flux reducing circuit.

The operation of the present invention will now be described.

The details of magnetic flux command signal generating circuit 5 are shown in FIG. 4. The inverter output frequency signal from the outside source is input to V/F converter 5a, which generates a motor applying voltage signal corresponding to this inverter output frequency signal. Numeral 5b designates a memory for storing data of the magnetic flux waveform. Numeral 5c designates a counter for addressing the memory 5b. Numeral 5d is a D/A converter for generating the has phase differences by 120° respectively: D/A converter 5d generates the three phase magnetic flux command signals by multiplying a wave height value signal and a digital signal of the magnetic flux waveform which is output from memory 5b.

Assume the following definitions: the wave height value signal of the magnetic flux command signal is defined as $\Phi_s$, and the magnetic flux waveform which is proportional to the frequency command from the outside source is defined as $\sin\omega t$; thus, the magnetic flux command signal becomes $\Phi_s \times \sin t$. Furthermore, assume a sum of gains to be amplified by error amplifying circuit 7, comparing circuit 8, driver circuit 10, inverter part 3 or the like is defined as G, a short circuit preventing period td and delay of switching of a powerswitching element, influenced by outer disturbances such as delay of the signal are defined as $\Delta V$, output voltage of inverter part 3 is defined as $V_M$, and the transfer function of integrating circuit 6 is by $1/(S \times T)$, (T is a time constant of the integrating circuit). According to the above assumptions, the following equation holds:

$$V_M \propto \frac{S \times T \times \Phi_s \times \sin\omega t + \frac{S \times T}{G} \times \Delta V}{\frac{S \times T}{G} + 1} \quad (1)$$

When the gain G is sufficiently large in equation (1), the following equation holds:

$$V_M \propto \omega \times T \times \Phi_s \times \sin\omega t \quad (2)$$

The equation (2) shows that if the wave height value signal $\Phi_s$ of the magnetic flux command signal $\Phi_s \times \sin\omega t$ is constant, the VVVF control, wherein V/F ratio of the output voltage and the output frequency is constant, is automatically realized. Furthermore, when the gain G is large enough, the influence of outer disturbance $\Delta V$ against the output voltage $V_M$ is reduced. Finally, when the carrier frequency is made to a non-audible frequency, it does not greatly influence the output voltage waveform distortion, so that generation of noise can be prevented.

Subsequently, FIG. 5 shows a characteristic figure of the inverter output voltage versus the inverter output frequency for the case that, in general, the induction electric motor is driven by the inverter apparatus and transfer is made from the VVVF control region to the voltage constant control region. In FIG. 5, the output frequency region, which is lower than the output frequency $F_o$, shows a constant torque characteristic wherein the ratio V/F of the output voltage versus the output frequency is constant; in the output frequency region, which is higher than the output frequency $F_o$, FIG. 5 shows a constant output characteristic of a constant output voltage.

If the magnetic flux of the motor is defined as $\Phi$, an inverter output voltage as $V_M$ and an inverter output frequency as f, the following equation holds:

$$\Phi \propto \int V_M dt \propto V_M/f \quad (3)$$

From the equation (3), in the case that the output frequency exceeds $F_{101}$ and control of a constant output voltage is made, the magnetic flux $\Phi$ of the motor is made to be inversely proportional to output frequency f.

In the embodiment, in the case that the control of the constant output voltage is accomplished, the wave height value signal $\Phi_s$, of a magnetic flux command signal $\Phi_s \times \sin\omega t$ which is generated by the magnetic flux command signal generating circuit 5 is made inversely proportional to an angular velocity $\omega$ from the above-mentioned equation (2). This function is performed by automatic magnetic flux reducing circuit 11, the details of which are shown in FIG. 6.

Figure 6:
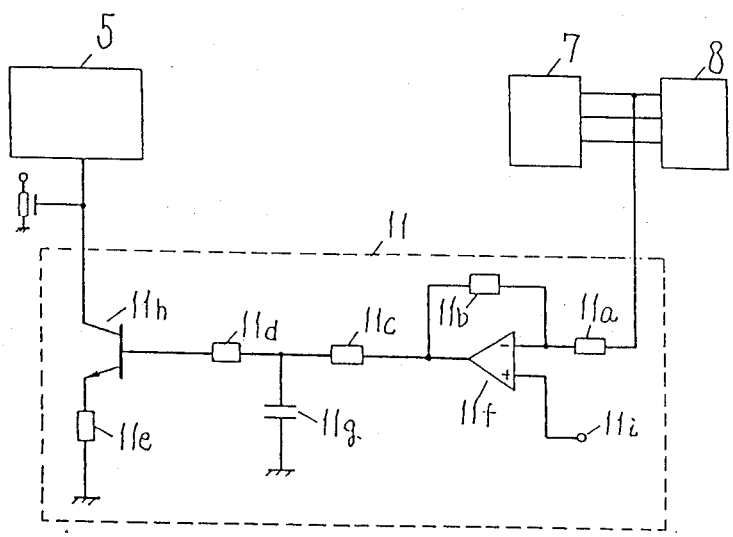
FIG. 6 is a figure showing an automatic magnetic flux reducing circuit to be used in the embodiment of the present invention.

In FIG. 6, numerals 11a, 11b, 11c, 11d, 11e designate fixed resistors, numeral 11f an operational amplifier, numeral 11g a capacitor, numeral 11h a transistor, and numeral 11i a terminal for giving peak voltage value of a modulated wave signal which is output by error amplifier circuit 7. The modulated wave signal is output by error amplifier 7 circuit 7 when the output frequency is $F_o$ for changing from VVVF control of FIG. 5 to the control of the constant output voltage.

Operation of the automatic magnetic flux reducing circuit 11 will now be described. When one phase of three phase modulated wave which is generated from the error amplifying circuit 7 or plural peak voltages becomes larger than the voltage value of terminal 11i, the difference voltage is inversed and amplified and made to a smoothed voltage by the fixed resistor 11c and the capacitor 11g. The transistor 11h is operated, and an electric potential of the wave height value signal $\Phi_s$ of magnetic flux command signal generating circuit 5, which is coupled to the collector of the transistor 11h, is lowered. As a result, the peak voltage of the modulated wave, which is output from the error amplifying circuit 7, becomes identical to the voltage value of terminal 11i. By the above-mentioned operation, even if the frequency is varied the peak voltage of the modulated wave signal which is amplified by the error amplifying circuit 7 is automatically made constant, and the output voltage of the inverter part 3 usually becomes constant.

Figure 7:
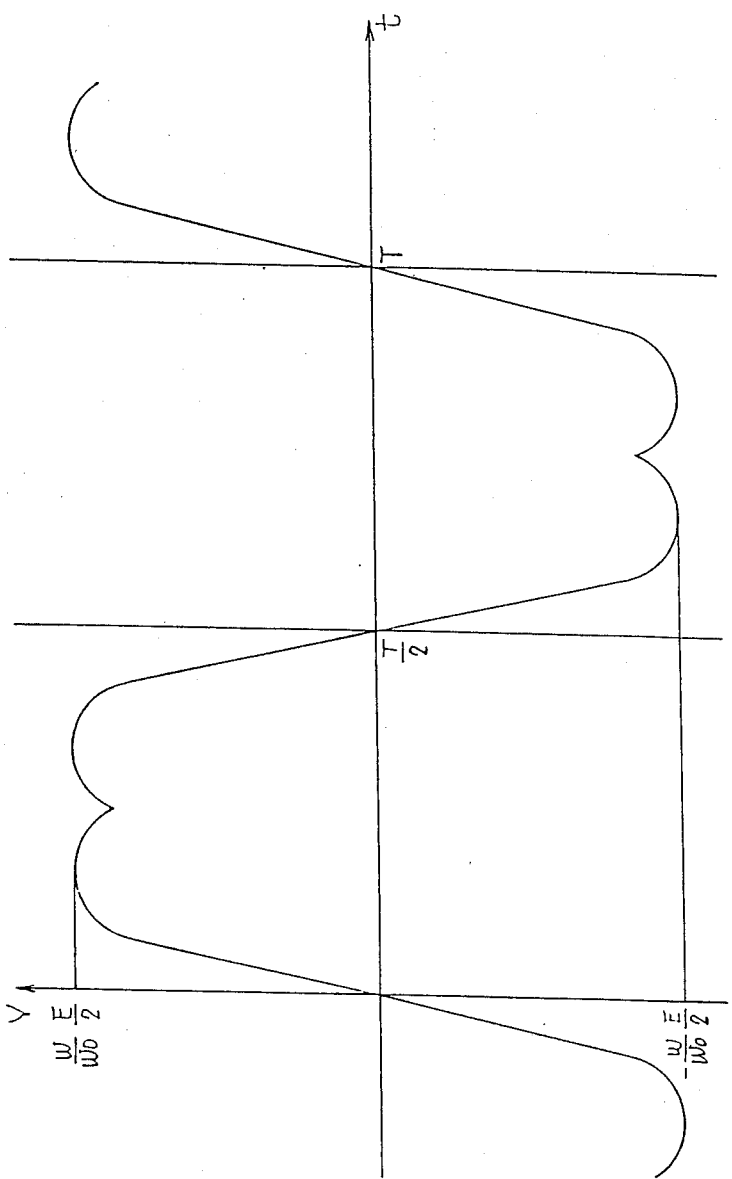
FIG. 7 is a figure showing a waveform of an inverter output voltage in another embodiment of the present invention.

In the embodiment, the modulated wave signal which is amplified by the error amplifying circuit 7 is made a sinusoidal wave, and the inverter output voltage which is applied to the motor is also made a sinusoidal wave. In another embodiment, a waveform as shown in FIG. 7 is made to be the inverter output voltage waveform. FIG. 7 shows an inverter output voltage waveform of one of three phases, whereby the other two phases are different by 120°, 240°, respectively. In FIG. 7 $\omega$ is angular velocity, $\omega_o$ is an angular velocity when an effective value of the inverter output voltage become maximum, and E is a direct current voltage which is output from converter part 2. A relation of the inverter output voltage waveform and the effective value of the inverter output voltage is described below.

In the circuit as shown in FIG. 3, the effective value of the power source voltage is Vr, and the three phases of the output voltages of the inverter part are respectively Vu, Vv, Vw. In the case that a capacitor having infinite capacitance is provided in converter part 2:

$$E = \sqrt{2} \times Vr.$$

Here, provided that the inverter part output voltage waveform is a sinusoidal wave, the following equation holds:

$$\begin{aligned}
Vu &= (E/2) \times \sin\omega t \\
&= (1/\sqrt{2}) \times Vr \times \sin\omega t \\
Vv &= (E/2) \times \sin(\omega t - 120°) \\
&= (1/\sqrt{2}) \times Vr \times \sin(\omega t - 120°).
\end{aligned}$$

The voltage Vu−v between lines is, $$Vu - v = \sqrt{3} \times (1/\sqrt{2}) \times Vr \times \sin(\omega t + 30°),$$

and the effective value V(u−v)r of the voltage between the lines is $$V(u - v)r = (1/\sqrt{2}) \times \sqrt{3} \times (1/\sqrt{2}) \times Vr \approx 0.866 \times Vr,$$

and in the case that the output voltage waveform of the inverter is sinusoidal wave, a voltage of 86.6% of the power source voltage is applied to the motor.

Subsequently a case is described for the output voltage waveform as shown in FIG. 7. This waveform is made to include harmonics on the order of an odd number which is a multiple of 3 in a sinusoidal wave, and the fundamental wave thereof and n-th order harmonics (n is an integer over 2) are shown by the following equations. Fundamental wave is:

$$Vu = (2/\sqrt{3}) \times (\omega/\omega_0) \times E \times \sin\omega t$$

n-th order harmonics (n is an integer over 2)

$$Vu = (2/\pi) \times (\omega/\omega_0) \times E \times \frac{1}{(n+1) \times (n-1)} \times \sin\frac{n}{2}\pi \times \left(2 \times \cos\frac{n}{3}\pi - 1\right).$$

Here, when the waveform of inverter output voltage of FIG. 6 and an effective value of the inverter output voltage are considered, it is sufficient that the fundamental wave is considered. If a fundamental wave of one phase in the three phases of the inverter output voltage is Vu, and a fundamental wave of the output voltage of one phase in other two phases is Vv, then Vu, Vv are shown by the following equations:

$$Vu = (2/\sqrt{3}) \times (1/\sqrt{2}) \times Vr \times \sin\omega t$$

$$Vv = (2/\sqrt{3}) \times (1/\sqrt{2}) \times Vr \times \sin(\omega t - 120°).$$

The voltage Vu−v between lines is:

$$Vu - v = \sqrt{3} \times (2/\sqrt{3}) \times (1/\sqrt{2}) \times Vr \times \sin(\omega t + 30°)$$

the effective value V(u−v)r of the voltage between lines is:

$$V(u - v)r = (1/\sqrt{2}) \times \sqrt{3} \times (2/\sqrt{3}) \times (1/\sqrt{2}) \times Vr = Vr;$$

and in the case of the inverter output voltage waveform of FIG. 7, the voltage of 100% of the power source voltage is applied to the motor.

In the embodiment, in order that inverter output voltage waveform is generated as shown in FIG. 7, data of the integrated value of the waveform of FIG. 7 is stored in memory 5b of FIG. 4.

Figure 8A:
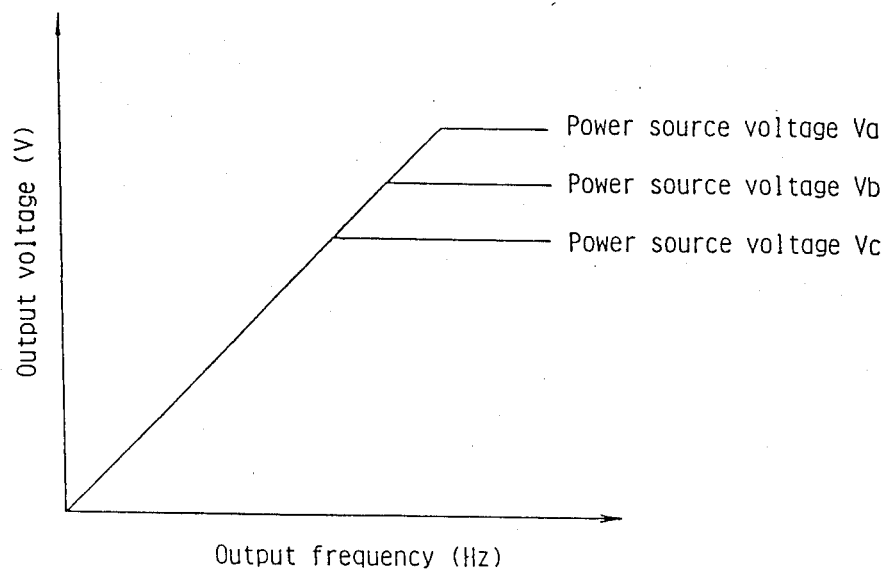
FIG. 8a is a figure showing output voltage versus the output frequency according to a characteristic of the inverter apparatus in the case where fluctuation is in existence in a power source voltage in an embodiment of the present invention.
Figure 8B:
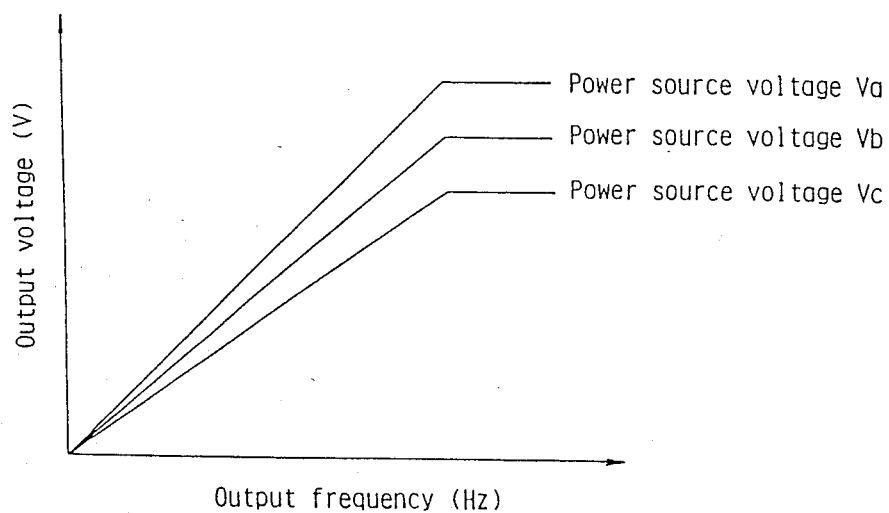
FIG. 8b is a figure showing output voltage versus the output frequency according to a characteristic of the inverter apparatus in the case where fluctuation is in existence in a power source voltage in a conventional inverter apparatus.

Furthermore, in the embodiment of the present invention, a relation of the inverter output frequency vs. output voltage when the power source voltage is varied is shown in FIG. 8a. In the conventional example, a relation of inverter output frequency vs. output voltage where the power source voltage is varied is shown in FIG. 8b: in the conventional example, the inverter output voltage generates a different output voltage, with respect to the same output frequency, to the direct current voltage which is output from the converter part. This is due to the fact that in the VVVF control, which has a constant V/F ratio with respect to the power source voltage, the V/F ratio will vary in response to a change of the power source voltage. In the embodiment of the present invention, however, the same output voltage is output having the same output frequency even if the power source voltage is varied. The same output voltage occurs because the ratio of V/F in the range of VVVF control, wherein integrated value of the voltage applying to the motor is fed back, is decided by the wave height value signal $\Phi_s$ of magnetic flux command signal generating circuit 5. Furthermore, in the embodiment of the present invention, a boundary frequency which varies from the VVVF control to a constant V control is varied with the variation of the power source voltage as shown in FIG. 8a.

As is obvious from the above-mentioned description the present invention constitutes a minor loop by feeding a signal made by integrating the motor-applied voltage back to the magnetic flux command signal which is proportional to a frequency command from an outside source; therefore, in the case that the carrier frequency is non-audible frequency, a waveform distortion of the output voltage due to a short circuit presenting period td of the switching element can be minimized. Therefore, the present invention provides an inverter apparatus producing a stable output voltage corresponding to the output frequency, so that a motor can be driven with low noise.

We claim:

1. An inverter apparatus for driving an electric motor comprising:
   magnetic flux command signal generating means for generating a magnetic flux command signal having a frequency proportional to an inverter output frequency signal, the inverter output frequency signal being input to said magnetic flux command signal generating means from an outside source,
   an inverter part for supplying electric power to the electric motor, the inverter part having an output voltage,
   integrating means for integrating the output voltage of the inverter part, the integrating means outputting a motor voltage integrating signal,
   error amplifying means for amplifying an error between the motor voltage integrating signal and the magnetic flux command signal,
   triangular wave generating means for generating a carrier frequency signal, and
   comparison means for generating a pulse width modulating signal on the basis of a comparison of the error amplified by the error amplifying means and the carrier frequency signal.

2. An inverter apparatus as recited in claim 1, wherein said magnetic flux command signal generating means generates a sinusoidal wave as the magnetic flux command signal.

3. An inverter apparatus as recited in claim 1, wherein said magnetic flux command signal comprises a sinusoidal wave and a second waveform having harmonics of order of an odd number and which are also a multiple of three times a fundamental frequency of the sinusoidal wave.

4. An inverter apparatus as recited in claim 1, further comprising an automatic magnetic flux reducing means for reducing a wave height value of the magnetic flux command signal to be inversely proportional to a frequency of said output voltage when the frequency of the output voltage exceeds a predetermined frequency, thereby entering a constant voltage region from a variable voltage, variable frequency control region.

5. An inverter apparatus as recited in claim 1, wherein a carrier frequency signal has a non-audible frequency which is higher in frequency than an audible range.

6. An inverter apparatus for driving an electric motor comprising:
- magnetic flux command signal generating means for generating a magnetic flux command signal having a frequency signal which is proportional to an inverter output frequency from an outside source,
- an inverter part for supplying electric power to the electric motor, the inverter part having an output voltage,
- integrating means for integrating the output voltage of the inverter part, the integrating means outputting a motor voltage integrating signal,
- error amplifying means for amplifying an error between the motor voltage integrating signal and said magnetic flux command signal,
- triangular wave generating means for generating a carrier frequency signal having a non-audible range which is higher in frequency than an audible range, and
- comparing means for generating a pulse width modulating signal in response to a comparison of the error amplified by the error amplifying means and the carrier frequency signal formed by said triangular wave generating means.

7. An inverter apparatus as recited in claim 6, wherein said command signal generating means generates a sinusoidal wave as said magnetic flux command signal.

8. An inverter apparatus as recited in claim 6, wherein said magnetic flux command signal comprises a sinusoidal wave having a fundamental frequency and a second waveform having harmonics of order of an odd number and which also are a multiple of three times the fundamental frequency.

9. An inverter apparatus as recited in claim 6, further comprising:
- automatic magnetic flux reducing means for reducing a wave height value of the magnetic flux command signal to be inversely proportional to a frequency of said output voltage when the frequency of the output voltages exceeds a predetermined frequency, thereby entering a constant voltage region from a variable voltage, variable frequency control region.

10. An inverter apparatus as recited in claim 6, wherein a carrier frequency signal has a non-audible frequency which is higher in frequency than an audible range.

11. An inverter apparatus for driving an electric motor comprising:
- a power supply,
- a converter part connected to the power supply,
- an inverter part connected to the convertor part and supplying an electric power to the electric motor,
- integrating means, connected with an output side of the inverter part, for integrating an output voltage of said inverter part,
- magnetic flux command signal generating means for generating a magnetic flux command signal of a frequency which is proportional to an inverter output frequency signal from an outside source,
- error amplifying means for amplifying an error between the magnetic flux command signal and the integrated output voltage from said integrating circuit,
- triangular wave generating means for generating a triangular wave having a non-audible carrier frequency signal which is higher in frequency than an audible region,
- comparing means for comparing the amplified error from said error amplifying means and said triangular wave, and
- driver means, responsive to an output signal from said comparing means, for driving said inverter part.

12. An inverter apparatus as recited in claim 11, wherein said command signal generating means generates a sinusoidal wave as said magnetic flux command signal.

13. An inverter apparatus as recited in claim 11, wherein said magnetic flux command signal comprises a sinusoidal wave having a fundamental frequency and a second waveform having harmonics of order of an odd number and which are also a multiple of three times the fundamental frequency.

14. An inverter apparatus as recited in claim 11, further comprising automatic magnetic flux reducing means for reducing a wave height value of the magnetic flux command signal to be inversely proportional to a frequency of said output voltage when the frequency of the output voltage exceeds a predetermined frequency, thereby entering a constant voltage region from a variable voltage, variable frequency control region.

* * * * *